(12) United States Patent
Sauter et al.

(10) Patent No.: US 7,839,107 B2
(45) Date of Patent: Nov. 23, 2010

(54) METHOD AND CIRCUITRY ARRANGEMENT FOR OPERATING A BRUSHLESS ELECTRIC MOTOR

(75) Inventors: Johannes Sauter, Mittelbuch (DE); Richard Buerk, Alberweiler (DE)

(73) Assignee: Kaltenbach & Voigt GmbH, Biberach (DE)

( * ) Notice: Subject to any disclaimer, the term of this patent is extended or adjusted under 35 U.S.C. 154(b) by 322 days.

(21) Appl. No.: 11/929,607

(22) Filed: Oct. 30, 2007

(65) Prior Publication Data

US 2008/0101777 A1    May 1, 2008

(30) Foreign Application Priority Data

Oct. 31, 2006    (DE) .................... 10 2006 501 499

(51) Int. Cl.
*H02P 6/18*    (2006.01)
(52) U.S. Cl. ............................. 318/400.35; 318/400.32
(58) Field of Classification Search ............ 318/400.32, 318/400.34, 400.35, 400.36, 700, 720–724
See application file for complete search history.

(56) References Cited

U.S. PATENT DOCUMENTS

| | | | | |
|---|---|---|---|---|
| 4,712,050 A | * | 12/1987 | Nagasawa et al. | ...... 318/400.04 |
| 5,754,016 A | * | 5/1998 | Jovanovic et al. | ........... 318/118 |
| 6,153,993 A | * | 11/2000 | Oomura et al. | ............. 318/434 |
| 6,534,938 B1 | * | 3/2003 | Wu et al. | ............... 318/400.28 |
| 6,570,353 B2 | | 5/2003 | Krotsch et al. | |
| 7,239,098 B2 | * | 7/2007 | Masino | .................. 318/400.35 |
| 7,733,042 B2 | * | 6/2010 | Kanamori | .................... 318/268 |

\* cited by examiner

*Primary Examiner*—Bentsu Ro
(74) *Attorney, Agent, or Firm*—Marshall, Gerstein & Borun LLP

(57) ABSTRACT

In a method of operating a brushless electric motor, having a permanent magnet rotor and a stator with three windings electrically offset by 120°, provided for example for driving a dental treatment instrument, the zero crossings of a voltage induced by rotation of the rotor in the stator windings is detected by a comparison of a voltage at an inactive stator winding in a monitoring phase with a comparison voltage, and on the basis of the detected zero crossings there is determined the speed of rotation of the motor and/or a suitable commutation point for an intermediate circuit voltage delivered to the stator windings. The comparison voltage is formed by the voltages at the two further, active stator windings in the monitoring phase.

15 Claims, 5 Drawing Sheets

STATE OF THE ART

METHOD AND CIRCUITRY ARRANGEMENT FOR OPERATING A BRUSHLESS ELECTRIC MOTOR

BACKGROUND OF THE INVENTION

1. Field of the Invention

The invention relates generally to a method and a circuitry arrangement for operating a brushless electric motor which has a permanent magnet rotor and a stator with three winding strands electrically offset by 120°. More specifically, the invention relates to an electric motor for driving a dental treatment instrument, for example a drill handpiece, or a dental-technical instrument.

2. Related Technology

Dental or dental-technical hand instruments normally have treatment tools which, with the aid of a drive, are set into oscillation or rotation. In particular with dental treatment instruments there is the possibility of configuring the drive in the form of an air motor or a turbine, or of using an electric motor. Turbines are normally more economical and space-saving; however an electric motor has with regard to its operational characteristics certain advantages. Thus an electric drive offers for example the possibility of varying the speed of rotation of the treatment tool and the torque exercised by the treatment tool. Through this the treatment instrument can be used more flexibly. Further, treatments can be carried out with a higher precision.

As motors for use in dental treatment instruments so-called brushless motors have in particular have proved to be suitable in the past. There are involved here motors having a permanent magnetic rotor which is surrounded by a stator having a plurality of windings. The stator normally has three winding strands electrically offset by 120°, to which there is delivered a supply voltage depending upon the disposition of the rotor. By appropriate switching-over (so-called "commutation") of the supply voltage for the stator windings the rotor is set into rotation by the rotating magnetic field thereby arising.

Such brushless electric motors, which are often described as BLDC (brushless direct current) motors, stand out inter alia due to their high performance efficiency. For this, however, it is a prerequisite that the commutation of the supply voltage for the stator windings is effected synchronously with the rotation of the rotor. Thus a detection of the angular position of the rotor is required, which could be effected by the use of appropriate sensors, in particular so-called Hall sensors. Since however additional components would be required for this, in the meantime the rotor disposition is also detected via the voltage induced in the stator windings, the so-called electromotive force (EMF), by the rotor. This voltage depends for the individual windings respectively on the dispositions of the magnet or the magnets of the rotor to the corresponding winding strand, whereby in particular the time point at which the voltage induced in a winding is equal to zero indicates a particular position of the rotor, which is taken into account for the derivation of a suitable commutation time point. Thus for example the commutation is normally carried out at a time point at which, after passing through the voltage zero-crossing, the rotor has turned by about a further 30°. By monitoring the EMF, the commutation of the supply voltage thus can be adapted to the rotor rotation in a suitable manner. Further, the speed of rotation of the motor also can be determined in this way.

FIG. 5 shows a circuitry arrangement known from the state of the art, which has been used to date for the detection of the EMF voltage zero-crossings for a brushless motor. To date, in principle, in this procedure either an artificial so-called star point was generated and the current-free phase to be examined compared against this artificial star point. As an alternative to this the star point of the motor could also be taken and directly delivered to a comparator.

FIG. 5 shows a solution in accordance with the first variant, as known for example from DE 100 23 370 A1, and in which, on the one hand, the voltages of the phases U, V and W arising at the three winding strands of the stator windings are respectively delivered to the (positive) inputs of three comparators IC1, IC2 and IC3 via three resistances R1, R2, and R3, and on the other hand are brought together to a common star point S via three resistances R4, R5, and R6. At the respective second inputs of the comparators IC1 to IC3 there is then applied the star point voltage arising in the star point S.

The three so-called star point resistances R4 to R6 have the same resistance value in this known circuitry arrangement, which has the consequence that the star point voltage can be calculated as follows:

$$U_{Starpoint} \approx \frac{1}{3} U_{EMF.PhaseNN} + \frac{1}{2} U_{ZK}$$

Here, $U_{EMF.PhaseNN}$ corresponds to the generator voltage of the motor at the phase (U, V or W) currently being examined, $U_{ZK}$ corresponds to the intermediate circuit voltage with which the stator windings are operated, while in contrast $U_{Starpoint}$ corresponds to the voltage at the artificial star point S.

The respectively active comparator IC1, IC2, or IC3 then calculates the difference voltage $$\Delta U = U_{EMF.PhaseNN} - U_{Starpoint}$$

or $$\Delta U = U_{EMF.PhaseNN} - \frac{1}{3} U_{EMC.PhaseNN} - \frac{1}{2} U_{ZK}$$

and switches when the voltage difference exceeds a determined hysteresis voltage. The voltage zero crossing detected in this way gives information about the disposition and the speed of rotation of the rotor.

This known circuitry arrangement in accordance with FIG. 5 has proved itself in practice and functions without problems in particular if the intermediate circuit voltage is stable and is not chopped by pulse width modulation. Thus no clocked final stage need be used for the motor but instead a regulated intermediate circuit is required.

If, however, the motor speed is regulated in that the motor voltage is produced by clocking the final stage, that is by pulse width modulation, this quickly leads with the circuitry arrangement known from the state of the art to disturbances and with that to faulty commutation of the motor. The reason for this is that false voltage zero-crossings are detected which arise due to voltage spikes which are produced by the pulse width modulation and have as consequence a false switching of the comparator. A further problem of the known circuitry arrangement in accordance with FIG. 5 consists in the fact that, upon a certain minimum speed of rotation of the motor being undershot, this no longer provides useable results, since the signals here obtained are too weak to unambiguously detect a voltage zero-crossing.

SUMMARY OF THE INVENTION

Accordingly, the invention provides a circuitry arrangement with the aid of which voltage zero-crossings can be detected unambiguously, also in the case that a clocked final stage is used for the rotational speed regulation or rotational speed control of the motor. Further, the circuitry arrangement is, with pure block commutation with a regulated intermediate circuit, also at lower speeds of rotation, still to deliver a clear zero crossing signal, so that in this case the utilizable range of speed of rotation can be enlarged downwardly.

In one aspect, the invention provides a method of operating a brushless electric motor having a permanent magnet rotor and a stator with three windings electrically offset by 120°, provided for example for driving a dental treatment instrument or a dental-technical instrument.

In another aspect, the invention further provides a circuitry arrangement for detecting the zero crossings of a voltage induced in stator windings, by rotation of a rotor, of a brushless electric motor, having a permanent magnet rotor and a stator with three windings electrically offset by 120°.

The invention also provides a brushless electric motor, particularly for use in a dental instrument or dental-technical instrument.

In yet another aspect, the invention provides a dental treatment instrument or dental-technical instrument comprising an electric motor according to the invention.

The solution in accordance with the invention is based on the idea of increasing the signal spacing or switching spacing for the comparators, in that instead of the artificial star point a special comparison voltage is generated from the two active phases of the stator winding and this is compared with the phase to be examined. This measure provides that a clear zero crossing signal can be obtained even in the event of disturbances, which could be caused by pulse width modulation, or with smaller signals which are present at lower speeds of rotation.

In accordance with the invention there is correspondingly proposed a method of operating a brushless electric motor, having a permanent magnet rotor and a stator with three windings electrically offset by 120°, for example for driving a dental treatment instrument, in which the zero crossings of a voltage induced by rotation of the rotor in the stator windings are detected by comparison of a voltage at an inactive stator winding in a monitoring phase with a comparison voltage, and on the basis of the detected zero crossings there is determined the speed of rotation the motor and/or a suitable commutation point for an intermediate circuit voltage delivered to the stator windings. In accordance with the invention it is provided that the comparison voltage is formed by the voltages at the two further, active stator windings in the monitoring phase.

In accordance with a further aspect of the invention there is proposed a circuitry arrangement for the detection of the zero crossings of a voltage induced in the stator windings, by rotation of the rotor, of a brushless electric motor, having a permanent magnet rotor and a stator with three windings electrically offset by 120°, having a comparison device for comparing a voltage at an inactive stator winding in a monitoring phase with a comparison voltage, whereby in accordance with the invention the comparison voltage is derived from the two voltages at the two further, active stator windings in the monitoring phase.

Further developments of the invention concern in particular measures by which the structure of the circuitry arrangement and the precision in the detection of the zero crossing is further improved.

Preferably the device for comparing the induced voltage with the comparison voltage is constituted by a comparator, wherein the two inputs of the comparator can then be bridged via a coupling capacitor with the aid of which voltage spikes are filtered. It can further be provided that a separate comparator is provided for each stator winding, wherein then the corresponding inputs for the comparators are in each case constituted identically. The winding strands can here be connected to the comparator in each case via corresponding resistances.

In another preferred development of the circuitry arrangement in accordance with the invention, the input signals for the comparator are initially reduced by a voltage divider, to bring the voltages into a working range of the comparator or comparators. As an alternative to this the voltages also could be limited to permitted values by clamping diodes at the inputs of the comparator.

It is ensured by the invention in each case that voltage zero crossings of the EMF induced in the stator windings can be detected dependably and reliably. Through this, it is ensured that the motor can be operated with high efficiency and the speed of rotation adjusted reliably.

BRIEF DESCRIPTION OF THE DRAWINGS

Below, the invention is explained in more detail with reference to the accompanying drawings.

FIG. 3b shows a variant of the circuitry arrangement of FIG. 3a;

FIG. 4b shows a variant of the circuitry arrangement of FIG. 4a; and

DETAILED DESCRIPTION OF PREFERRED EMBODIMENTS

Figure 1:
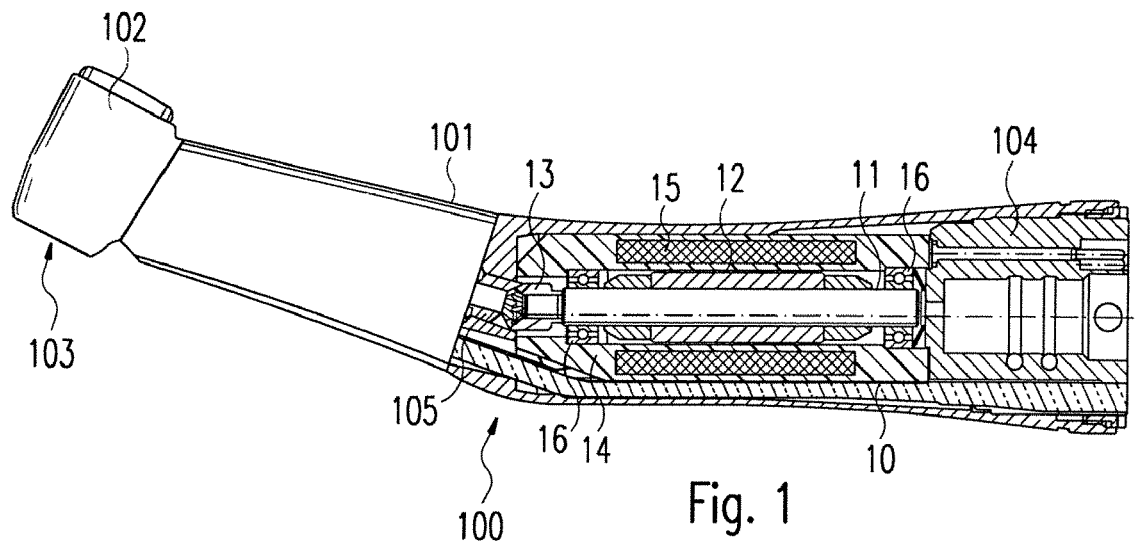
FIG. 1 shows a view of a dental treatment instrument with which a brushless electric motor with a circuitry arrangement configured in accordance with the invention is put to use.

FIG. 1 shows as a possible application of the invention a dental handpiece, provided generally with the reference sign 100, which has a grip sleeve 101 which is elongate, slightly bent or angled in the forward end region. At the forward end of the grip sleeve 101 there is arranged a head section 102 which has a tool receiver 103 for receiving a rotatably mounted tool, for example a dental drill. For treatment purposes the drill received in the tool receiver 103 is set into rotation, which is effected with the aid of a motor 10 which is arranged in the rearward region of the grip sleeve. This is an electric motor which is supplied with current from a dental supply facility via a supply hose (not shown). For this purpose there is provided at the rearward end of the grip sleeve 101 of the handpiece 100 a coupling element 104 with the aid of which the handpiece 100 can be attached to the supply hose.

The motor 10 is a so-called brushless electric motor. It is comprised in substance of a rotor 11 having one or a plurality of permanent magnets 12 and a stator 14 surrounding the rotor 11. In turn the stator 14 has a plurality of stator windings 15 which (as described in more detail below) are provided alternatingly with a supply voltage. By the alternating control of the stator windings 15 a magnetic field changing temporally is produced which so interacts with the permanent magnet or permanent magnets 12 of the rotor 11 that this rotates. For this purpose the rotor 11 is arranged rotatably within the stator 14 by means of two bearings 16. At the forward end of the rotor there is further a gear wheel 13 which interacts with a corresponding counterpart 105 of a drive shaft, via which the rotation of the rotor 12 is then finally transferred to the tool receiver 103.

Such brushless motors stand out due to their compact structure and their high efficiency. It is, however, a prerequisite for this that the stator windings of the stator are provided with voltage in an appropriate manner or at appropriate times. An example of a control circuit constituted for this is illustrated schematically in FIG. 2.

Figure 2:
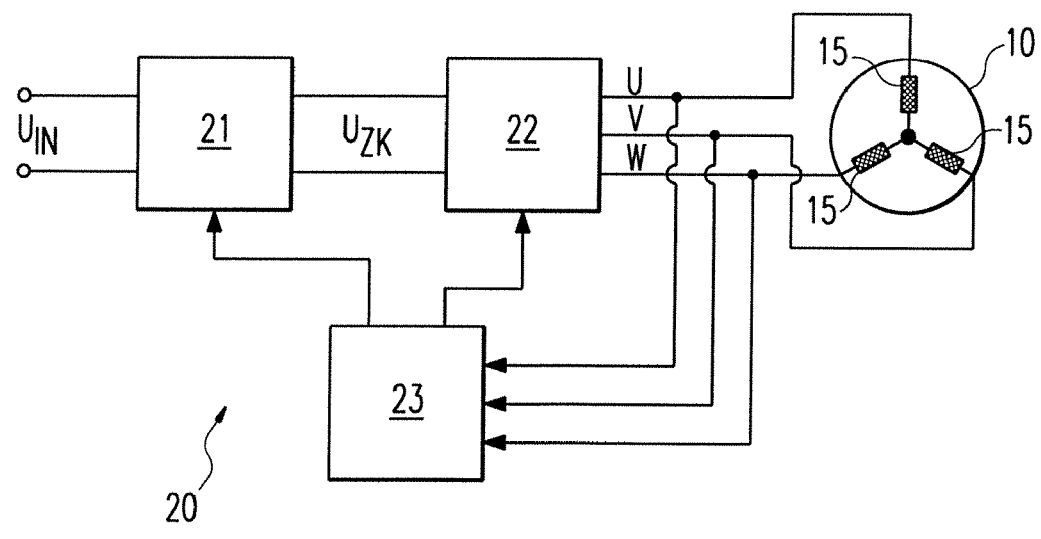
FIG. 2 shows schematically the structure of a control circuit for operating the brushless electric motor.

This circuit, provided generally with the reference sign 20, has in the illustrated example on the input side an intermediate circuit regulator 21 via which the supply voltage $U_{IN}$ for the motor is regulated to a certain value. This intermediate circuit voltage $U_{ZK}$ is then delivered to an inverter 22 which provides the three stator windings of the motor 10 with voltage in dependence upon the input signal of a control and regulation unit 23. It is to be noted that FIG. 2 shows one possible configuration for the control circuit. Alternatively to the intermediate circuit regulator 21 the circuitry arrangement 20 also could have on the input side for example a simple rectifier or a DC voltage source.

It is important for the voltage supply of the stator windings 15 by the inverter 22 that the time points at which changes between the individual phases U, V, W take place are coordinated with the rotor disposition. The angular position of the rotor is now detected without the use of additional sensors but via voltage induced in the windings by the rotor. Here there is exploited the fact that the rotating permanent magnet or the permanent magnets of the rotor induce a voltage in the stator windings, wherein the development of this induced voltage (EMF) gives information about the disposition of the rotor.

Figure 3A:
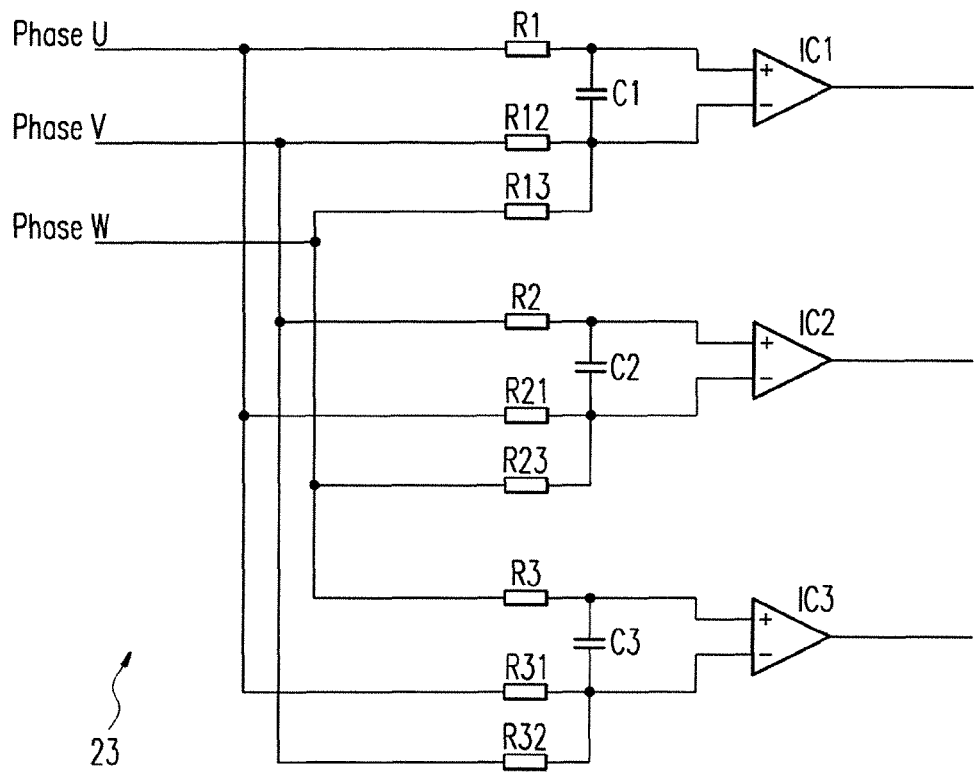
FIG. 3a shows a first embodiment of a circuitry arrangement for detecting voltage zero crossings in accordance with the invention.

Taken exactly the task consists in detecting at which times the voltage induced in the respective stator windings is equal to zero or changes sign. For this purpose the control and regulation circuit 23 has on the input side a circuitry arrangement configured in accordance with the invention for the detection of zero crossing, as is illustrated in FIG. 3*a* and will be explained in more detail below.

Figure 5:
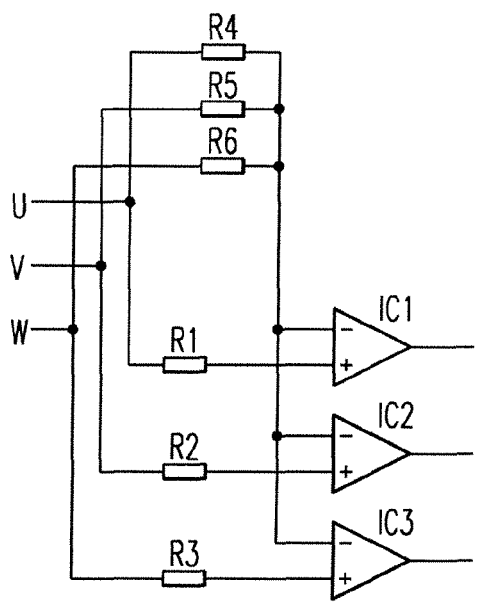
FIG. 5 shows the structure of a corresponding circuitry arrangement for the detection of voltage zero crossings in accordance with the state of the art.

As also with the known circuitry arrangement in accordance with the state of the art in FIG. 5 (the same components are provided with the same reference signs in the illustrations) it is provided that for each stator winding it is individually detected at which time point the voltage induced in the corresponding winding strand is equal to zero. Correspondingly there is provided for each phase U, V, W a respective comparator IC1, IC2, IC3, wherein there is passed to this comparator initially, via a resistance R1, R2, or R3, the corresponding voltage of the phase U, V, W. This first input signal is now compared with a comparison voltage which is derived from the voltages at the two further stator windings. For the first comparator IC1 this means, for example, that the comparison voltage for the phase U is formed in that two further resistances, R12 and R13, are connected in each case to the winding strands of the phases V and W, wherein the common output or node point then forms the comparison signal for the comparator IC1. Thus the comparison voltage is produced with the aid of a voltage divider which is formed by the two resistances R12 and R13. The two inputs of the comparator IC1 are here bridged via a capacitor C1 whose task it is to filter capacitively or inductively coupled voltage spikes.

In the same manner the comparison voltages for zero crossing detection are also formed for the two further phases V and W. To the negative input of the comparator IC2 there are correspondingly connected the two phases U and W in each case via a resistance, R21 or R23, whilst the comparison voltage for the third comparator IC3 is formed, in contrast, at the node point of the outputs of the two phases U and V with the resistances R31 and R32. Also the two further comparators IC2 and IC3 are in each case bridged by capacitors C2 and C3.

The resistance values for the resistances with the aid of which the comparison voltage is generated are preferably in each case of the same level and furthermore preferably twice as large as the resistances via which the voltage to be examined is passed on to the comparator. There thus preferably applies:
R12=R13
R21=R23
R31=R32

And further:
R1=½ R12
R2=½ R21
R3=½ R31

In this case there is provided for the comparison voltage(s) with active PWM phase the following value:

$$U_{Comparison} = \tfrac{1}{2} U_{ZK}$$

The comparator IC1, IC2, or IC3 then compares the voltage of the inactive phase to be examined with the comparison voltage formed by the two active phases and switches as soon as the voltage difference exceeds a certain hysteresis voltage.

There now applies for the voltage difference:

$$\Delta U = U_{EMF.PhaseNN} - U_{Comparison}$$

or $$\Delta U = U_{EMF.PhaseNN} - \tfrac{1}{2} U_{ZK}$$

As can be readily understood, the difference voltage ΔU in the embodiment in accordance with the invention is thus greater than with the known circuitry arrangement of FIG. 5 by around a third of the electromotive force $U_{EMF}$. This means that a considerably better signal spacing is obtained, through which false detection of the zero crossings can be avoided. Further, the difference signal is sufficiently high also at lower speeds of rotation to reliably detect zero crossings of the EMF.

The circuitry arrangement in accordance with the present invention offers the advantage that the detection is possible during each PMW phase independently of whether at the time there is present an active PMW phase a floating PMW phase or an active free running phase. The reason for this is that the comparison voltage is always correctly present, to make possible a reliable comparison.

Figure 3B:
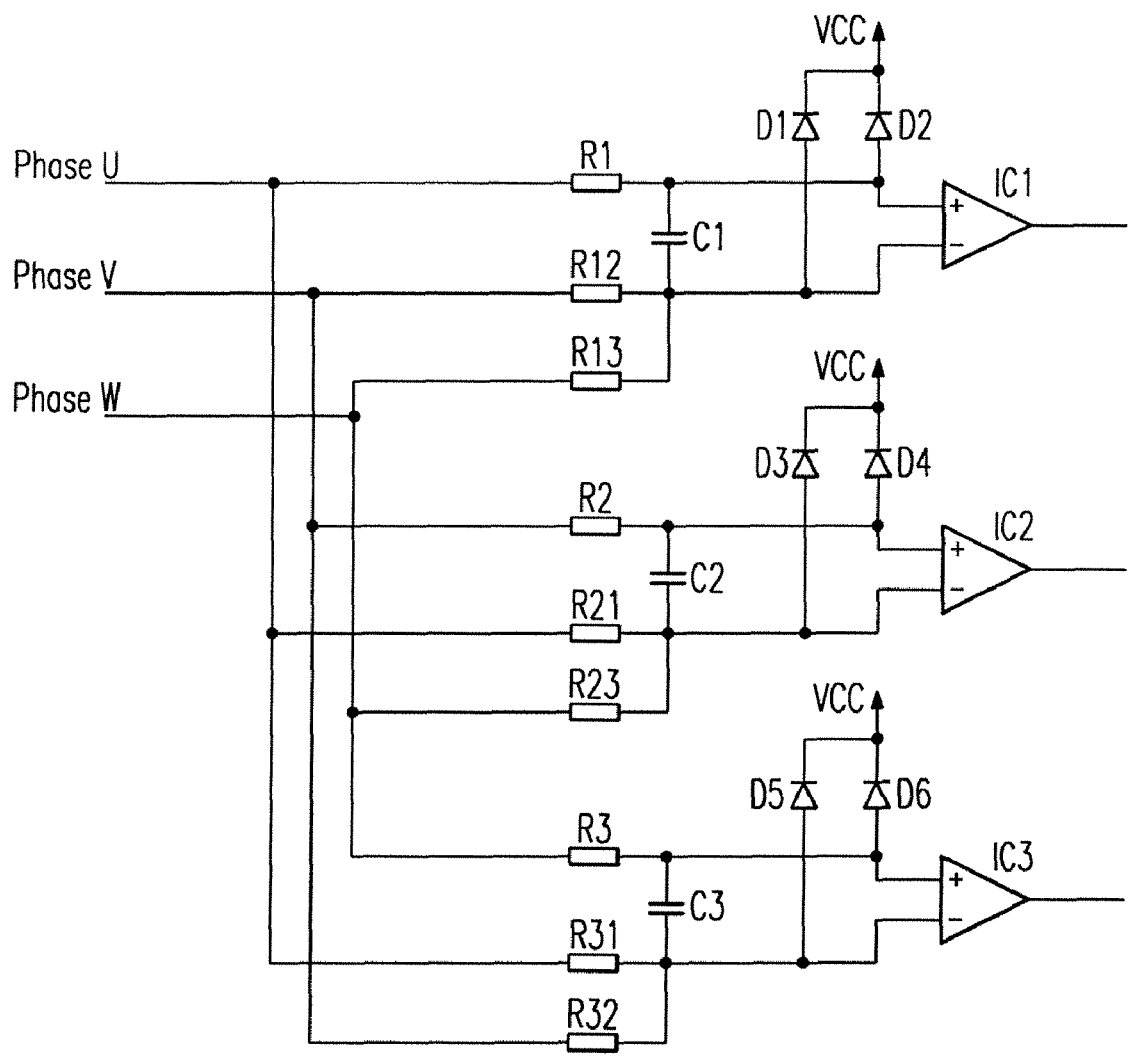

A development of the circuitry arrangement of FIG. 3*a* is illustrated in FIG. 3*b*. In this variant the voltages at the inputs of the comparators IC1, IC2, IC3 are limited to permitted values by means of clamping diodes D1, D2, D3, D4, D5, and D6. Through this it is ensured that the voltage values to be compared are in every case within the working range of the comparators. The reliability of the circuitry arrangement in accordance with the invention is thereby further improved.

Figure 4A:
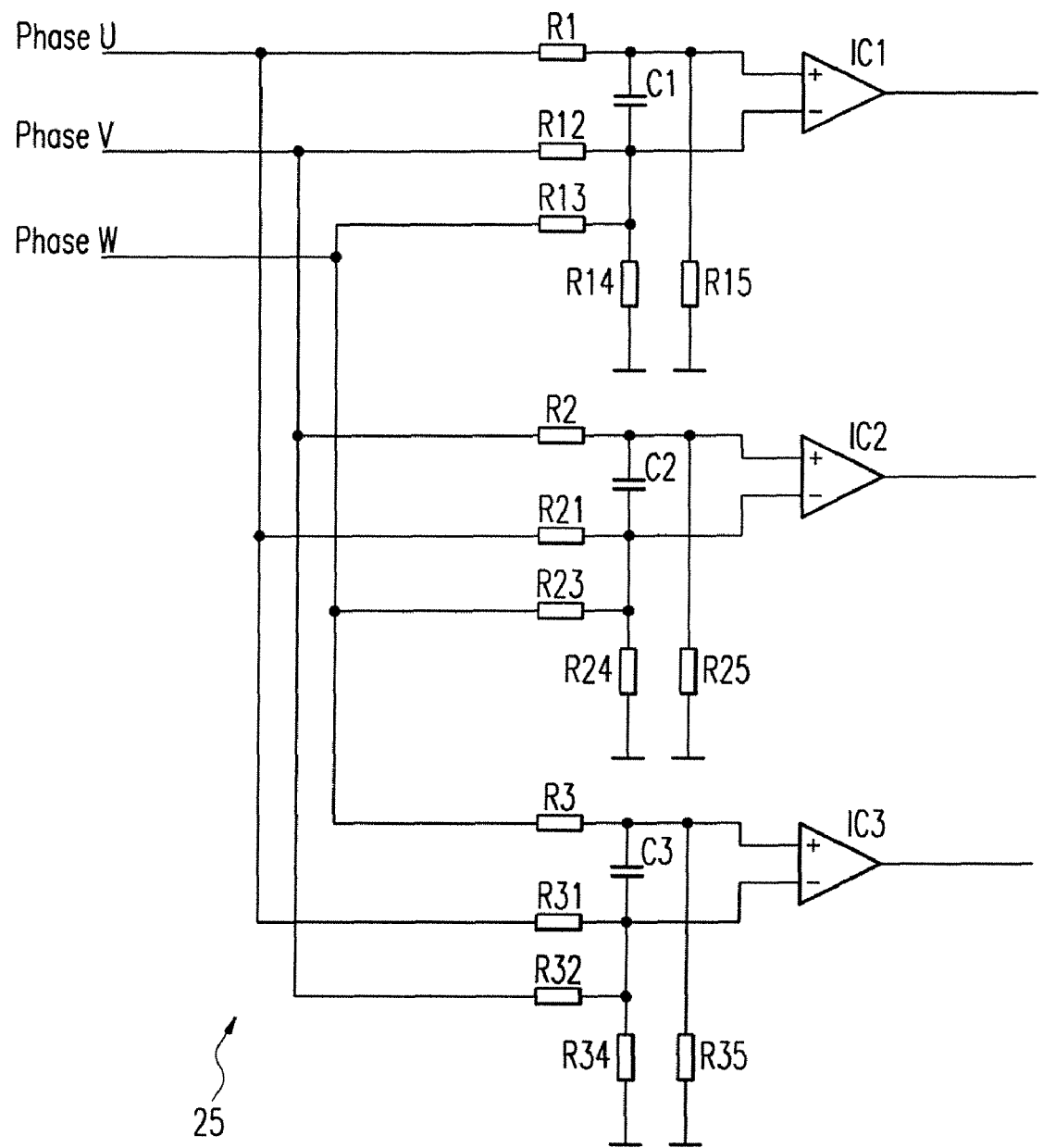
FIG. 4a shows a second embodiment of a circuitry arrangement in accordance with the invention.

Another extension of the circuitry concept of FIG. 3*a* is illustrated in FIG. 4*a*. Also in this embodiment the input voltages for the comparators IC1, IC2, or IC3 are firstly reduced such that they lie in every case within in the working range of the comparators. This is effected, instead of by means of the clamping diodes shown in FIG. 3*b*, by means of voltage dividers, which are formed by resistances R14, R15, R24, R25, R34, and R35, via which in each case the corresponding input of the comparator respectively is connected to ground. For the resistances for monitoring the first phase U the following relation preferably applies:

R12=R13
R1=½R12=½R13
R14=R15

In corresponding manner the resistance values for the monitoring of the two further phases V and W are also selected.

Figure 4B:
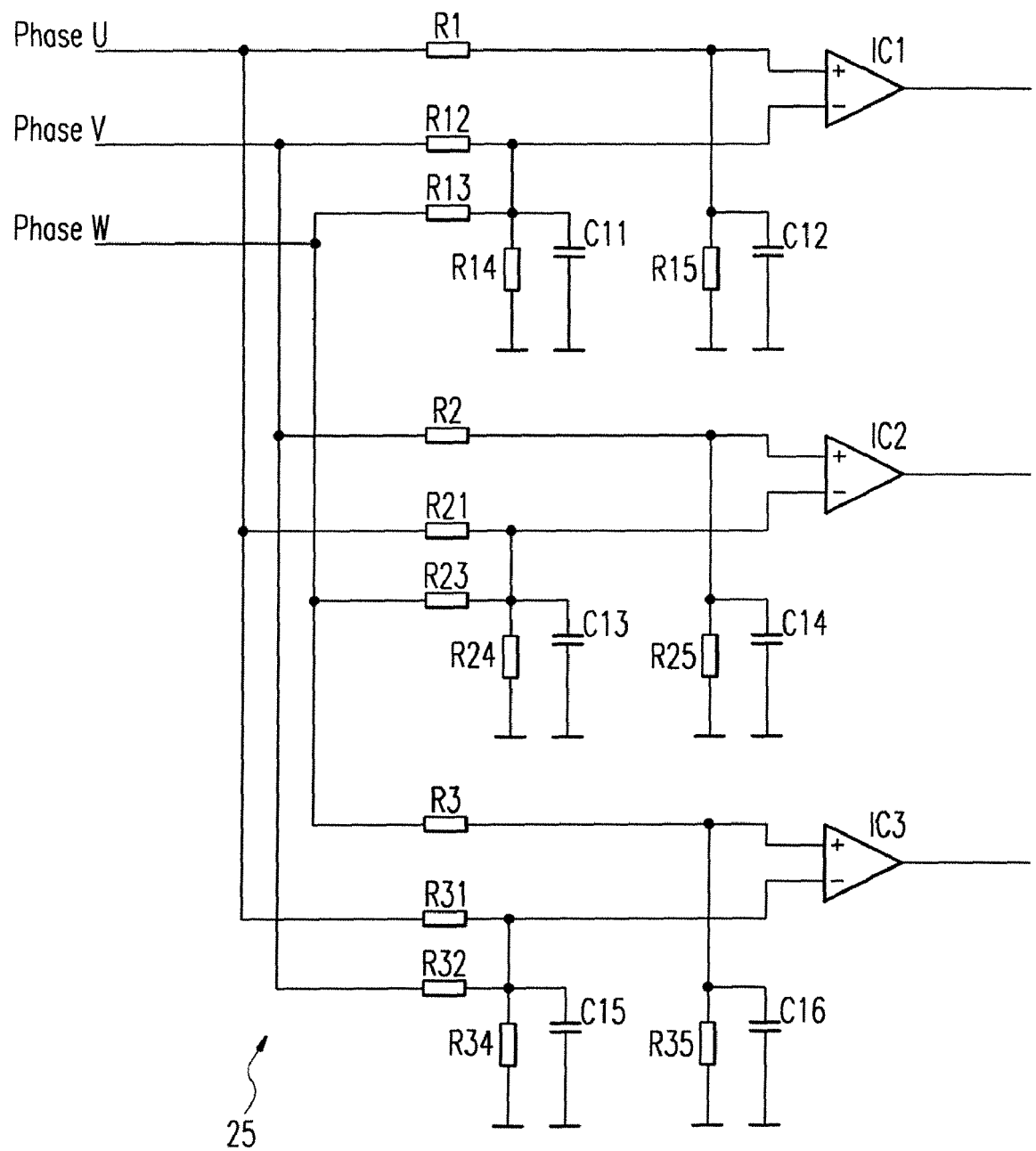

Alternatively to the capacitors C1, C2, and C3 which bridge the two inputs of the comparators IC1, IC2, IC3, there can in each case be capacitors connected to ground. This variant is illustrated in FIG. 4b. Now, six capacitors C11, C12, C13, C14, C15, and C16 are put to use, which are in each case connected in parallel to one of the resistances R14, R15, R24, R25, R34, and R35 for forming the voltage dividers.

Altogether, it can this be understood that through the use of a new comparison voltage the zero crossings for the EMF can be detected more reliably. Through this a correct operation of the brushless electric motor is ensured in every case. Further, since a reliable zero crossing detection is effected also at lower speeds of rotation, both the performance efficiency of the motor and the range of applications for the electric motor can be enlarged.

Thereby, in conclusion it has to be emphasized that although the above-described application to dentistry or dental technology represents a preferred example, the present invention is, however, not at all restricted to these fields. Thus it would be possible without further measures to put to use a corresponding circuitry arrangement also in industrial motors, for example. The present invention brings about advantages generally when for the operation of brushless electric motors zero crossings of the EMF are to be detected reliably.

The invention claimed is:

1. A method of operating a brushless electric motor having a permanent magnet rotor and a stator with three windings electrically offset by 120°, said method comprising:
   detecting zero crossings of a voltage induced by rotation of the rotor in the stator windings by comparing a voltage at an inactive stator winding in a monitoring phase with a comparison voltage formed by the voltages at the two further, active stator windings in the monitoring phase, and
   determining on the basis of the detected zero crossings at least one of the speed of rotation of the motor and a suitable commutation point for an intermediate circuit voltage delivered to the stator windings,
   wherein each of the two further active stator winding voltages is passed through a respective resistor, each resistor having the same resistance value, the resistance value being twice as large as a resistance value of a resistor through which the inactive stator winding voltage passes.

2. Method of claim 1, comprising forming the comparison voltage with the aid of a voltage divider, which is formed by two resistances which are connected to the two active stator windings.

3. Method of claim 1, comprising detecting a zero crossing as soon as the difference between the voltage induced in the inactive stator winding and the comparison voltage exceeds a predetermined hysteresis value.

4. Method of claim 1, comprising effecting the comparison between the voltage induced in the inactive stator winding and the comparison voltage by a comparator.

5. Method of claim 4, comprising bridging the inputs of the comparator by a capacitor.

6. Method of claim 4, comprising reducing the voltages delivered to the comparator to values corresponding to the working range of the comparator by a voltage divider or by clamping diodes.

7. Circuitry arrangement for detecting the zero crossings of a voltage induced in stator windings, by rotation of a rotor, of a brushless electric motor, having a permanent magnet rotor and a stator with three windings electrically offset by 120°, said circuitry arrangement comprising a comparison device for comparing a voltage at an inactive stator winding in a monitoring phase with a comparison voltage wherein the comparison voltage is derived from the two voltages at the two further, active stator windings in the monitoring phase, each of the two further active stator winding voltages being passed through a respective resistor before entering the comparison device, each resistor having the same resistance value, the resistance value being twice as large as a resistance value of a resistor through which the inactive stator winding voltage passes before entering the comparison device.

8. Circuitry arrangement of claim 7, comprising, for forming the comparison voltage, a voltage divider formed by two resistances which are connected to the two active stator windings.

9. Circuitry arrangement of claim 7, wherein the comparison device detects a zero crossing as soon as the difference between the voltage induced in the inactive stator winding and the comparison voltage exceeds a predetermined hysteresis value.

10. Circuitry arrangement of claim 7, wherein the comparison device is formed by a comparator.

11. Circuitry arrangement of claim 10, wherein the comparator comprises inputs bridged by a capacitor.

12. Circuitry arrangement of claim 10, comprising a voltage divider or clamping diodes for reducing the voltages delivered to the comparator to values corresponding to a working range of the comparator.

13. Circuitry arrangement of claim 7, wherein the monitoring of the zero crossings of the voltages induced in the stator windings is effected in each case by separate comparison devices.

14. Brushless electric motor, which is provided for example for driving a dental treatment instrument or a dental-technical instrument, said electric motor comprising:
   a) a permanent magnet rotor,
   b) a stator with three windings electrically offset by 120°,
   c) a circuitry arrangement for detecting zero crossings of a voltage induced by rotation of the rotor in the stator windings, and
   d) a control and regulation unit, which on the basis of the detected zero crossings detects at least one of the speed of rotation of the motor and a suitable commutation time point for an intermediate circuit voltage delivered to the stator windings, wherein the circuitry arrangement for detecting the zero crossings is the circuitry arrangement of claim 7.

15. Dental treatment instrument or dental-technical instrument comprising an electric motor of claim 14.

* * * * *